Sept. 8, 1925.
A. A. LINK
TRACTOR
Filed Aug. 22, 1923     2 Sheets-Sheet 1
1,553,088
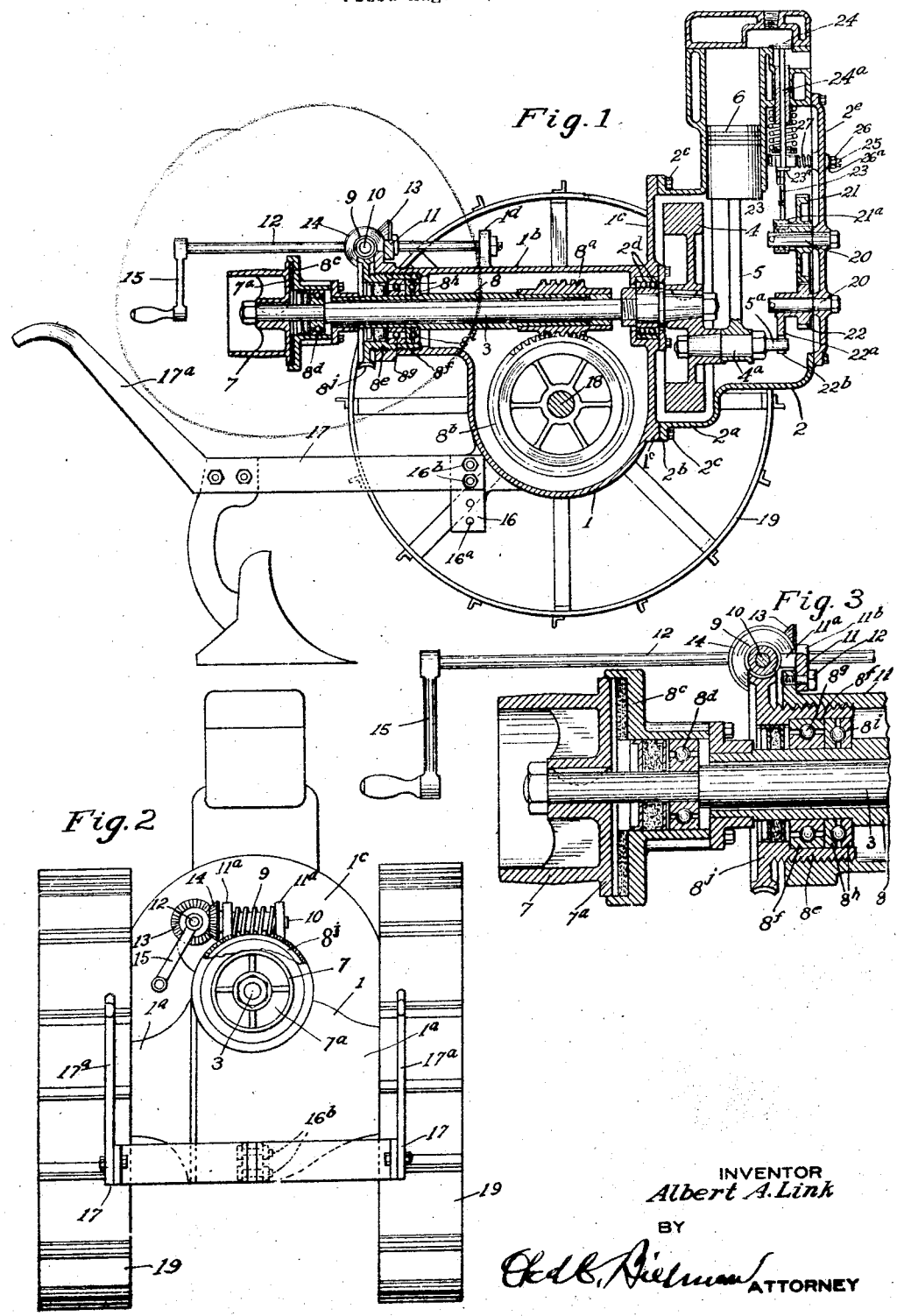
INVENTOR
Albert A. Link
BY
ATTORNEY Sept. 8, 1925.
A. A. LINK
TRACTOR
Filed Aug. 22, 1923    2 Sheets-Sheet 2
1,553,088
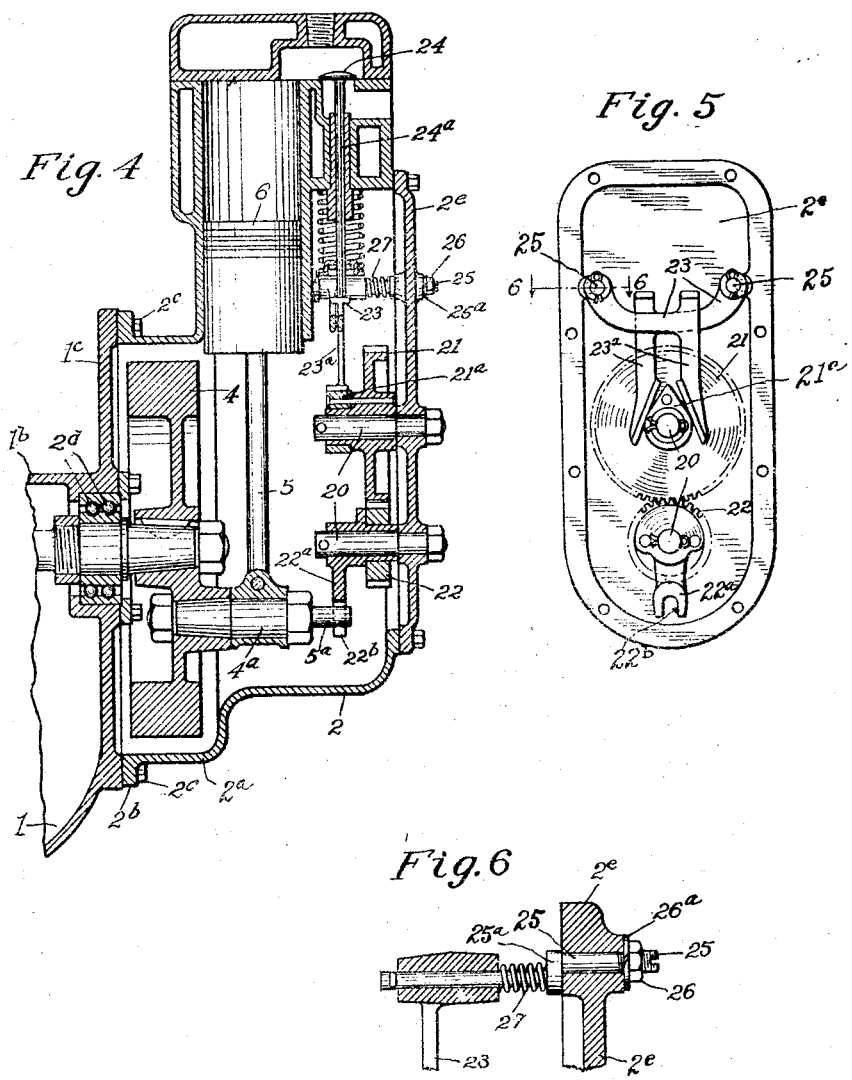
INVENTOR
Albert A. Link
BY
[signature] ATTORNEY Patented Sept. 8, 1925.

1,553,088

UNITED STATES PATENT OFFICE.

ALBERT A. LINK, OF BELLEVUE, OHIO.

TRACTOR.

Application filed August 22, 1923. Serial No. 658,699.

*To all whom it may concern:*

Be it known that I, ALBERT A. LINK, a citizen of the United States, residing at Bellevue, in the county of Huron and State of Ohio, have invented certain new and useful Improvements in Tractors, of which the following is a specification.

My invention relates to improvements in tractors and more particularly to that type or class commonly known as "garden tractors" particularly designed and adapted for use in the cultivation of orchards, vineyards, and small fruits, as well as tobacco, potatoes, corn and other vegetables that are planted in rows.

The improved tractor is particularly adapted to carry all the tool or earth working implements for garden cultivation.

The primary object of the invention is to provide a generally improved tractor of this class which will be exceedingly simple in construction, cheap of manufacture and efficient in use.

A still further and very important object is the provision of a tractor of the two-wheel type upon which will be supported and balanced the entire weight of the driving motor and the intermediate driving mechanism, together with the attached parts in the respective earth-working and non-earth-working positions of the tractor.

A still further and important object is the provision of simple and efficient mechanism for throwing the power and propeller shafts into and out of engagement with respect to the power plant through suitable manually operable mechanism within convenient reach of the driver or operator at the steering and controlling handles at the rear of the earth-working elements.

A still further object is the provision of an improved detachable motor or prime mover at the front of the axle carrying and gear enclosing housing having a removable cover plate carrying the valve actuating mechanism and by means of which the various internal parts of the motor may be readily inspected or adjusted or repaired.

With the above mentioned and other ends in view, the invention consists in the novel construction, arrangement and combination of parts, hereinafter described, illustrated in one of its embodiments in the accompanying drawings, and particularly pointed out in the appended claims.

Referring to the drawings, forming a part of this specification, Figure 1 is a central longitudinal sectional view of a tractor constructed in accordance with this invention, the clutch members between the power and propeller shafts being thrown into engagement.

Fig. 2, a rear elevation of the same.

Fig. 3, an enlarged longitudinal sectional view of the adjustable bearing head and clutch mechanism between the power and propeller shafts, the clutch members being thrown out.

Fig. 4, an enlarged central sectional view of the detachable motor or engine and the connecting crank and valve gear casing therefor.

Fig. 5, a plan view of the rear or underside of the valve gear bearing cover, detached.

Fig. 6, an enlarged fragmentary sectional view of one of the adjustable eccentrically mounted valve actuating lever bearings, taken on line 6—6 of Fig. 5.

Similar numerals of reference designate like parts throughout all the figures of the drawings.

The frame or body of the tractor may be of any suitable and convenient construction, and, in the present instance, comprises a transverse axle bearing housing 1, having axle bearings $1^a$, said housing 1 being provided at its top with a longitudinally extending power and propeller shaft casing $1^b$. The power or crank shaft casing $1^b$ terminates at its front in a motor attaching and carrying head $1^c$, adapted to removably receive and carry the engine or motor carrying crank and valve gear casing 2, at the front. In the present instance, the internal combustion engine is of the single cylinder four-cycle type, the casing 2 being open at one side and being provided with an off-set rim portion $2^a$, terminating in an annular attaching flange $2^b$, for attaching the engine to and supporting the same from the flanged portion of the head 1ᶜ by means of the cap screws 2ᶜ.

The motor attaching and supporting head 1ᶜ is provided with a central bearing opening adapted to removably receive and contain suitable anti-friction bearings 2ᵈ, the latter, in the present instance, being of the ball bearing type.

As a convenient means of transmitting power to the driving axles, and particularly as a means of throwing the power and propeller shafts into and out of gear, as desired, a longitudinally extending power or crank shaft 3, is provided, the latter being connected to the motor in any suitable and convenient manner, as for example, by means of a crank pin 4ᵃ carried, in the present instance, on a fly wheel 4, the latter being detachably mounted on the front end of the power or crank shaft 3. The crank pin 4ᵃ is suitably connected to a connecting rod 5, connected to the piston 6.

The opposite or rear end of the power shaft 3 is provided with a pulley 7, adapted to receive a belting for the transmission of power when the tractor is used as a stationary engine, and said shaft 3 is provided with a clutch member 7ᵃ which latter, in the present instance, is formed as a part of the pulley 7.

The propeller shaft 8 preferably comprises a tubular or sleeve shaft surrounding the power shaft and is provided at one end with a worm 8ᵃ, adapted to mesh with and drive a worm gear or wheel 8ᵇ when the clutch members between the power and propeller shafts are thrown in. The propeller sleeve shaft 8 is provided at its opposite or rear end with a relatively fixed clutch member 8ᶜ in cooperative relation to the clutch 7ᵃ, said clutch member 8ᶜ being preferably provided with antifriction bearings 8ᵈ for supporting the rear end of the shaft 3 when the latter is running independently of the clutch and propeller shaft.

As a means of supporting the rear ends of the power and propeller shafts, and particularly as a means of moving the propeller sleeve shaft longitudinally and relatively of the power shaft, and thereby correspondingly shifting the clutch member 8ᶜ into and out of engagement with the cooperating clutch member 7ᵃ of the power or crank shaft, the rear end of the propeller shaft 8 is provided with a circumferentially movable bearing head 8ᵉ, the latter, in the present instance, being in the specific form of an externally threaded sleeve mounted in a correspondingly threaded portion of the rear end of the propeller and crank shaft casing 1ᵇ. The sleeve portion of the bearing head 8ᵉ is provided with a bearing ring 8ᶠ cooperating with a companion ring forming a ball race-way for carrying anti-friction ball bearings 8ᵍ for receiving the circumferential thrusts of the sleeve or propeller shaft and is also provided with a second set of bearing rings 8ʰ carrying intervening ball bearings 8ⁱ for receiving the axial thrusts and stresses of the shafts when the clutch members are thrown into engagement with each other.

As a means of manually actuating the bearing head 8ᵉ to throw the clutch members into and out of engagement, the bearing head 8ᵉ is provided with a gear 8ʲ meshing with a worm 9 carried on a shaft 10, the latter being mounted in suitable bearing lugs 11ᵃ of a transverse bracket 11 attached to the flanged portion of the propeller shaft casing 1ᵇ by means of cap screws 12ᵃ. The bracket 11 is provided with a third bearing lug 11ᵇ (see Fig. 3) and the casing 1ᵇ is provided with a lug 1ᵈ, (see Fig. 1) said lugs 11ᵇ and 1ᵈ being adapted to removably receive and carry an operating shaft 12 provided with a bevel gear 13, meshing with a bevel gear 14, carried by the cross shaft 10, which latter carries the worm 9. The operating shaft 12 is provided at its rear end with an operating handle 15 extending rearwardly within convenient reach of the operator or driver of the tractor. The lower portion of the gear housing 1 may be provided with a draw bar 16 having suitable vertically arranged openings 16ᵃ, to receive connecting bolts 16ᵇ for connecting the tool holder beams 17, terminating in handles 17ᵃ, the latter being used for balancing and steering the tractor and the cultivator or earth-working elements carried thereby. If desired, suitable adapter bars or plates may be connected to the control beams 17.

The worm gear 8ᵇ communicates motion to the axle shafts 18, and carrying the traction wheels 19, through any suitable and convenient gearing and such gearing forming no specific part of this invention need not be described in detail.

In the present instance the motor carrying crank casing 2, is provided at its front with a valve gear carrying cover 2ᵉ provided with inwardly extending pins 20, the latter carrying gear and pinion members 21 and 22, respectively, the pinion 22 receiving its motion through a crank arm 22ᵃ, having a slotted portion 22ᵇ, extending over a bearing pin or extension 5ᵃ of the crank pin 4ᵃ of the fly wheel 4. The gear 21 is provided with a cam 21ᵃ, adapted to alternately transmit motion to the depending arms 23ᵃ of the transversely disposed overlapping bell crank levers 23 for actuating the valve stems 24ᵃ of the valves 24, which latter are actuated in the usual synchronous relation to the piston of the engine.

As a means of changing the timing and throw of the valve actuating bell cranks 23, the latter are mounted on adjustable eccentrically mounted bearing bolts 25 having intermediate bearing portions 25ᵃ, said bolts 25 being adapted to be turned and adjusted and held in any desired adjusted position by means of the nuts 26 and lock washers 26ᵃ, coiled springs 27 being preferably interposed between the underside of the cover 2ᵉ and the bearing portions of the bell cranks.

The bearing carrying cover 2ᵉ not only affords access to the interior of the crank casing 2, and the contained ports when removed, but also enables the valve actuating gearing to be removed bodily with the removal of the cover 2ᵉ.

From the foregoing description taken in connection with the accompanying drawings, the operation and advantages of my invention will be readily understood.

Having thus described one of the embodiments of my invention, without having attempted to set forth all the forms in which it may be made, or all the modes of its use, what I claim and desire to secure by Letters Patent is,—

1. In a tractor, including a transverse axle bearing housing having a superposed longitudinal propeller shaft casing, a motor and motor casing at the front of the latter, a power shaft including anti-friction bearings mounted in said casing and connected at its front to said motor, a clutch and pulley at the rear end of said power shaft, a propeller sleeve shaft having a worm at one end and clutch member at the other in cooperative relation to the clutch of said power shaft, means for supporting said power and sleeve shafts, and means for moving said sleeve shaft longitudinally relatively of said power shaft to throw said clutch member into and out of engagement with the clutch member of said power shaft.

2. In a tractor, a casing including a gear housing having transverse axle bearings, axles mounted in the latter, traction wheels driven by said axles, differential gearing connected to the latter including a worm gear, a longitudinally extending power shaft in said casing above said gear wheel and provided at one end with a fly wheel and at the other with a clutch member, a propeller sleeve shaft surrounding said power shaft and provided with a worm meshing with said worm gear, a circumferentially movable bearing head provided with bearings for said sleeve shaft, means for adjusting said bearing head to carry said sleeve shaft into and out of engagement with said power shaft, and a power plant carried by said gear housing and connected to said power shaft.

3. In a tractor, an axle bearing housing including an open ended propeller shaft casing, a power shaft extending through said casing, a prime mover at one end of said casing and connected to said power shaft, a clutch member at the opposite end of said power shaft and casing, a propeller shaft terminating in a worm at one end and a clutch member at the opposite end in cooperative relation to said power shaft clutch member, a movable bearing head normally closing one end of said propeller shaft casing and provided with side and thrust bearings supporting one end of said power and propeller shafts, means for moving said bearing head circumferentially and longitudinally in said propeller shaft casing, and means for moving said bearing head to move said propeller shaft and clutch member into and out of engagement with said power shaft and clutch member.

4. In a tractor, an axle bearing housing including a longitudinal open ended propeller shaft casing, a power shaft in said casing, an engine having a crank casing closing the front end of said casing connected to one end of said power shaft, a pulley and clutch member connected to the opposite end of said power shaft, a propeller sleeve shaft surrounding said power shaft and terminating in a worm at one end and a clutch head at the opposite end in cooperative relation to the clutch member of said power shaft, a bearing collar adjustably mounted in and closing the rear end of said propeller shaft casing and supporting the rear ends of said power and propeller sleeve shafts, means for moving said bearing collar circumferentially and longitudinally in the rear end of said propeller shaft casing, and manually operable adjusting mechanism connected to said adjustable bearing.

5. In a tractor, a casing including differential gearing, a differential gear housing including transverse axle bearings, axles mounted in the latter, traction wheels mounted on and driven by said axles, differential gearing including a gear wheel, a longitudinally extending power shaft in said casing above said gear wheel and provided at one end with a fly wheel and at the other with a clutch member, a propeller sleeve shaft surrounding said power shaft and provided with a clutch member and a worm gear meshing with said gear wheel, a circumferentially and longitudinally movable bearing head provided with radial anti-friction bearings for said propeller sleeve shaft, means for adjusting said bearing head to carry said propeller sleeve shaft into and out of engagement with said shaft through said clutch member, and a power plant carried by said casing and connected to said propeller shaft.

6. In a tractor, a frame including an axle bearing housing and a superposed open ended longitudinal propeller shaft casing, a motor and crank casing connected to the front of the latter, a power shaft mounted in said propeller shaft casing and provided at its front with a fly wheel and crank arm connected to said motor, a clutch member at the rear end of said power shaft, a propeller sleeve shaft having a worm at one end and a clutch member at the other in cooperative relation to the clutch of said power shaft, means for supporting said power and sleeve shafts, means for moving said sleeve shaft longitudinally to throw said sleeve shaft clutch member into and out of engagement with the clutch member of said power shaft, a worm gear meshing with said worm, and axle and traction wheels operatively connected to said worm gear.

In testimony whereof I have affixed my signature.

ALBERT A. LINK.